(12) United States Patent
Brotzman, Jr. et al.

(10) Patent No.: US 10,976,474 B2
(45) Date of Patent: Apr. 13, 2021

(54) ANTI-STATIC LENS COATINGS

(71) Applicant: Motorola Mobility LLC, Chicago, IL (US)

(72) Inventors: Richard W. Brotzman, Jr., Naperville, IL (US); Deborah M. Paskiewicz, Downers Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 174 days.

(21) Appl. No.: 15/804,927

(22) Filed: Nov. 6, 2017

(65) Prior Publication Data

US 2019/0137663 A1 May 9, 2019

(51) Int. Cl.
*G02B 1/16* (2015.01)
*G02B 1/14* (2015.01)
*G02B 1/04* (2006.01)

(52) U.S. Cl.
CPC .......... *G02B 1/16* (2015.01); *G02B 1/14* (2015.01); *G02B 1/041* (2013.01)

(58) Field of Classification Search
CPC ............. G02B 1/16; G02B 1/14; G02B 1/041
See application file for complete search history.

(56) References Cited

U.S. PATENT DOCUMENTS

| 2013/0273354 | A1* | 10/2013 | Horio | G02B 1/105 |
| | | | | 428/331 |
| 2014/0043585 | A1* | 2/2014 | Wilson | G02B 1/14 |
| | | | | 351/159.57 |
| 2017/0299898 | A1* | 10/2017 | Gallina | B29D 11/00 |

FOREIGN PATENT DOCUMENTS

WO   WO-2007083969 A1 * 7/2007 ............. C09J 11/04

* cited by examiner

*Primary Examiner* — Jade R Chwasz
(74) *Attorney, Agent, or Firm* — Fig. 1 Patents (57) ABSTRACT

In implementations of anti-static lens coatings, a device lens comprises an anti-static material disposed on an exterior of the device lens. A hard coat material is disposed as a layer over the anti-static material, where the anti-static material is effective to prevent static build-up on the layer of the hard coat material. The anti-static material can include a first surface treatment disposed on the anti-static material, where the first surface treatment binds the anti-static material to the device lens. The anti-static material can also include a second surface treatment disposed on the anti-static material, where the second surface treatment binds the anti-static material to the hard coat material.

21 Claims, 5 Drawing Sheets

ANTI-STATIC LENS COATINGS

BACKGROUND

The increasing portability of electronic devices allows users to take these devices to previously unforeseen environments and to be used in a multitude of ways. This portability, however, also increases the likelihood that the electronic devices will be subject to conditions that may be harmful to the electronic devices, such as drops, bumps, foreign materials, and so forth. Electronic devices often have a display and/or external surfaces that are covered with a lens, which may be made of plastic or glass, for example. Plastic lenses that cover all or part of an electronic device are often electrical insulators that accumulate static charge, which attracts foreign materials such as lint and dirt to the lens. These plastic lenses typically have an exterior hard coat, because the lenses are susceptible to scratching, marring, gouging, and fracture under relatively mild use conditions, such as being carried in a purse. However, effective hard coats often contain particulates that increase a dielectric constant of the lens above a dielectric constant of the lens alone. Even though the lens is protected from physical damage by the hard coat, the increased dielectric constant of the hard coat has an unintended effect of causing even more foreign materials to be attracted to the electronic device.

BRIEF DESCRIPTION OF THE DRAWINGS

Implementations of anti-static lens coatings are described with reference to the following Figures. The same numbers may be used throughout to reference similar features and components shown in the Figures.

DETAILED DESCRIPTION

Implementations of anti-static lens coatings are described, and provide techniques to incorporate anti-static coatings for lenses of electronic devices while still maintaining the protection provided by hard coats on the electronic devices. For example, an anti-static material can be disposed on an exterior of a device lens, such as during assembly of the device. A device lens is an exterior surface of an electronic device, such as device back covers and/or display lens materials. Then, a hard coat material is disposed over the anti-static material. Despite being disposed underneath the hard coat material, the anti-static material is effective to prevent static build-up on an exterior of the layer of the hard coat material. By preventing static build-up on the hard coat material, attachment of foreign materials such as dust and other debris to the hard coat material is reduced or eliminated, and the device is protected from damage that these foreign materials may cause.

While features and concepts of anti-static lens coatings can be implemented in any number of different devices, systems, environments, and/or configurations, implementations of anti-static lens coatings are described in the context of the following example devices, systems, and methods.

Figure 1:
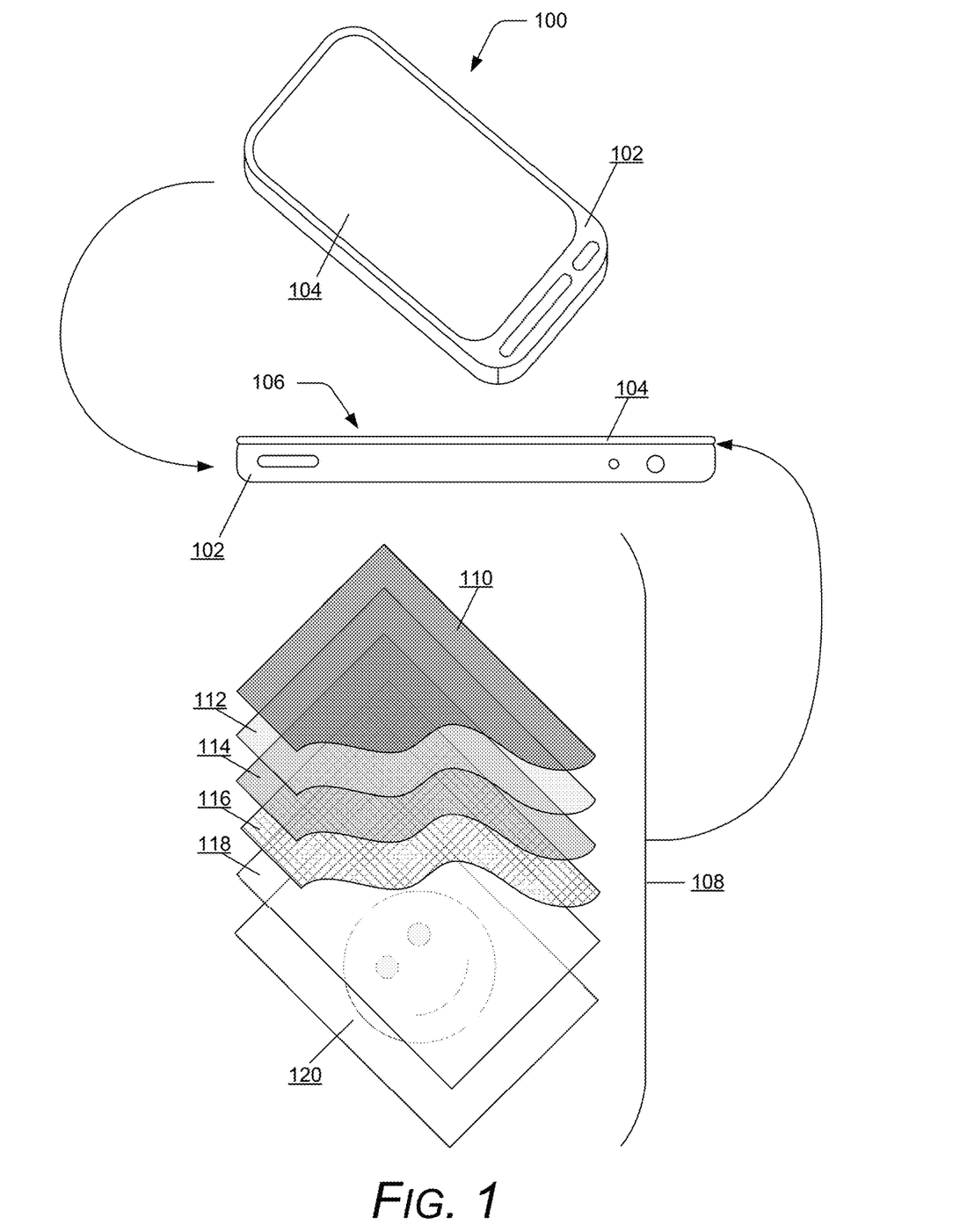
FIG. 1 illustrates an example of an electronic device and techniques of anti-static lens coatings as described herein.

FIG. 1 illustrates an example 100 of an electronic device 102 and techniques of anti-static lens coatings for the electronic device, as described herein. In this example, the electronic device may be any type of electronic device, such as a mobile phone, tablet device, laptop or desktop computer, television, device accessory (e.g., mouse, keyboard, headphones, webcam, etc.), and so forth. Generally, the electronic device 102 is an electronic and/or computing device implemented with various components, such as a processing system and memory, as well as any number and combination of different components found on electronic devices.

The electronic device 102 includes a display 104 for the presentation of information in visual form, such as a segment display, a full-area 2-dimensional display (e.g., light-emitting diode (LED) display, electroluminescent (ELD) display, electronic paper display, liquid crystal display (LCD), plasma display panel (PDP), organic light-emitting diode (OLED) display, active-matrix organic light-emitting diode (AMOLED) display) and so forth. Alternatively or in addition, the display 104 may be a touchscreen display while information is presented in visual form. Generally, a touchscreen display allows users to give input or control an information processing system of the electronic device 102 through gestures by touching the screen with a stylus or one or more fingers.

The electronic device 102 is also shown in a side view 106, such as when the electronic device is placed with the display 104 facing up, as though the electronic device were sitting on a table or other flat surface. In the illustrated side view 106, the display 104 is shown atop the electronic device 102. The display 104 may be made up of a number of layers 108, for example including, but not limited to, a hard coat material 110, an anti-static material 112, a lens layer 114, a layer of driving and sensing lines 116, a plastic or glass substrate layer 118, and an AMOLED display screen 120. In this example, the hard coat material 110 is the exterior layer over the anti-static material 112 and the other layers, and the layer of the hard coat material 110 protects the other layers from being damaged. The order and composition of the layers 108 is not limited to the order and composition shown in FIG. 1, and may be altered such as according to the following example implementations shown and described in relation to FIGS. 2-6.

The hard coat material 110 is a protective material of plastic or glass that shields the display 104 from damage, as well as general wear and tear. In one example, the hard coat material 110 is formulated from acrylate prepolymers and silica ($SiO_2$) particles, and may contain from 20 wt % to 70 wt % silica. Additional details on example hard coat layers and materials can be found in U.S. patent application Ser. No. 15/181,722 entitled "Polymer Hard Coat and Methods of Preparation", which is incorporated by reference herein in its entirety. The anti-static material 112 may be formulated from acrylic prepolymers and conductive salts such as chloride salts, containing from 0.05 atomic % to 4.0 atomic % chloride ions. The positive ion (cation) in the chloride salt may be selected from, but not limited to, sodium, potassium, magnesium, calcium, ammonium, and so forth. The acrylic prepolymers of the anti-static material 112 may include conductive salts such as ammonium chloride at additive levels sufficient to achieve a desired level of sheet resistance.

Additionally, acrylic prepolymers of the anti-static material 112 may include conductive additives such as antimony, indium, and carbon compounds at additive levels sufficient to achieve a desired level of sheet resistance.

The lens layer 114 is another protective material, such as plastic or glass, which provides additional shielding of the display 104 from damage, as well as the general wear and tear. The lens layer 114 may include a variety of transparent lens materials, where the transparency of the hard coat material 110, the anti-static material 112, and the lens layer 114 is greater than 90% at visible wavelengths of light. Example materials that can be used for the lens layer 114 include polyethylene terephthalate (PET), polycarbonate (PC), polymethylmethacrylate (PMMA)/PC/PMMA, colorless polyimide (CPI), polyamide (PA), and so on. The layer of driving and sensing lines 116 form a grid of electrical conductors configured to sense inputs, such as touch inputs on the display 104. The layer of driving and sensing lines 116 may utilize electrical resistance and/or electrical capacitance to sense touch inputs on the display 104. The layer of driving and sensing lines 116 may be implemented with indium tin oxide (ITO) material, for instance.

The glass substrate layer 118, such as plastic or glass, may form a backing to the layer of driving and sensing lines 116 to complete a circuit when a touch input is initiated in a resistive touch display, or may be layered between conductors of the driving and sensing lines in a capacitive touch display, for instance. The AMOLED display screen 120 consists of an active matrix of OLED pixels generating light upon electrical activation that have been deposited or integrated onto a thin-film transistor (TFT) array. Although an AMOLED display screen 120 is pictured, any suitable display screen may be used, examples of which are provided above. Examples of anti-static lens coatings, such as the example electronic device 102, are shown and described in further detail with reference to FIG. 2.

Figure 2:
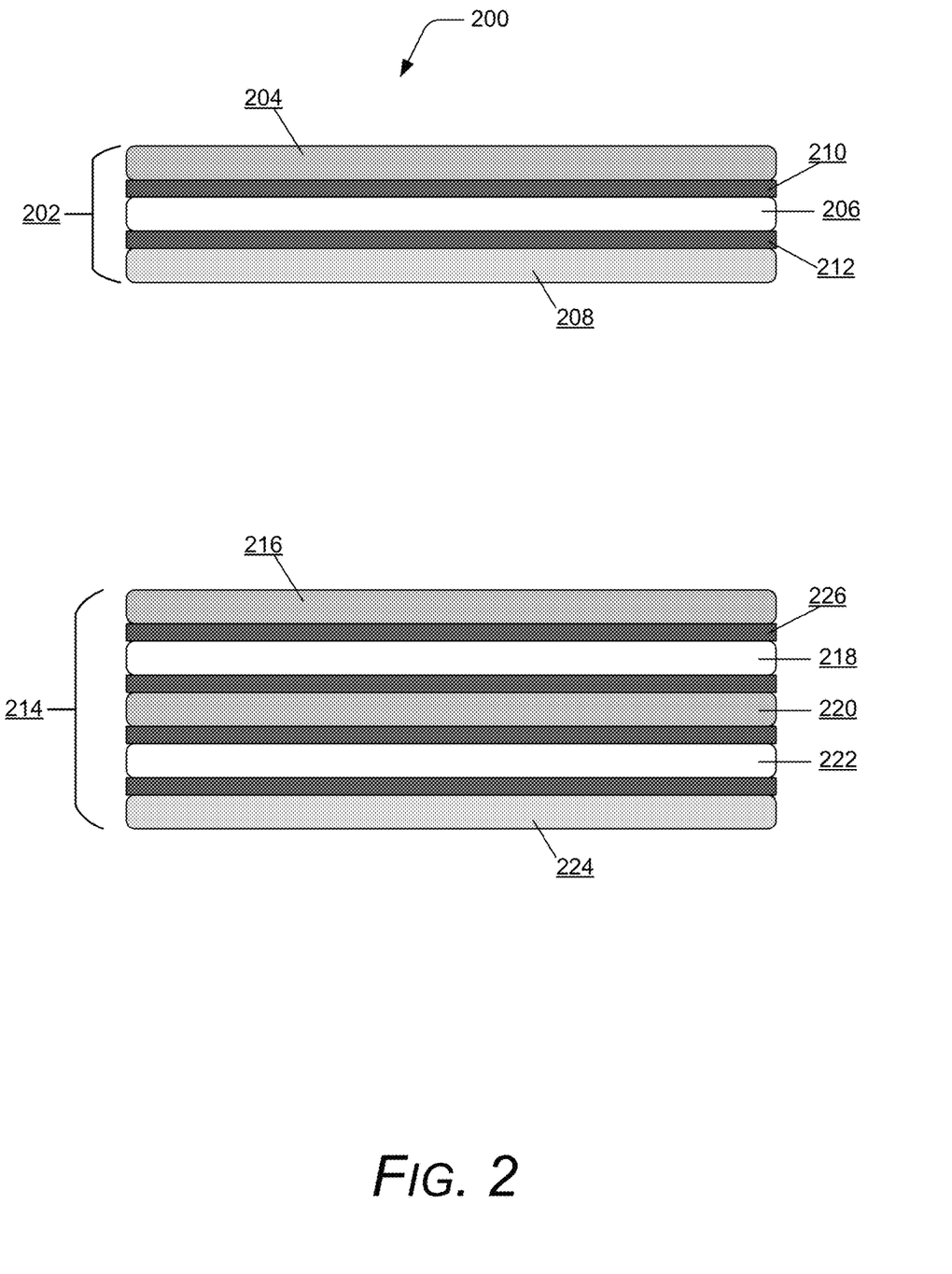
FIG. 2 illustrates example configurations of anti-static lens coatings as described herein.

FIG. 2 illustrates an example 200 of anti-static lens coatings, such as the electronic device 102, implementing the techniques described herein. A first set of layers 202 is shown, which includes a hard coat layer 204 (i.e., a layer of hard coat material), an anti-static layer 206 (i.e., a layer of anti-static material), and a device lens 208. The hard coat layer 204 may correspond to the hard coat material 110, the anti-static layer 206 may correspond to the anti-static material 112, and the device lens 208 may correspond to the lens layer 114, for instance. Interfaces between layers, such as the first set of layers 202, may require surface treatments, which incorporate a physical or chemical modification to the layer surface to improve surface wettability with respect to an additional material, or improve or provide adhesion between two layers. Surface treatments may be applied to layers using vapor, plasma, wet chemical, adhesive depositions, and so forth.

A first interface 210 is disposed between the hard coat layer 204 and the anti-static layer 206. Similarly, a second interface 212 is disposed between the anti-static layer 206 and the device lens 208. The first interface 210 and the second interface 212 are designed to enable interfacial adhesion between the respective layers 204, 206, and 208. The first interface 210 and the second interface 212 may have surface treatments applied on the device lens 208 and on the anti-static layer 206. In this example, a surface treatment of the first interface 210 binds the anti-static layer 206 to the hard coat layer 204, and a surface treatment of the second interface 212 binds the anti-static layer to the device lens 208.

The hard coat layer 204 may attract foreign materials such as dust, due to a high dielectric constant caused by incorporation of particulates in the hard coat layer. For instance, the hard coat layer 204 may contain particulates which cause foreign materials to be drawn to the hard coat layer, and are not easily removed. However, the anti-static layer 206 disposed between the hard coat layer 204 and the device lens 208 dissipates charges that may accumulate on the hard coat layer, thus preventing static build-up on the hard coat layer.

In other implementations, additional alternating layers of hard coat and anti-static may be used to protect a device lens and prevent static build-up. For example, the second set of layers 214 includes a hard coat layer 216, an anti-static layer 218, an additional hard coat layer 220, and an additional anti-static layer 222, all disposed upon a device lens 224. One or more interfaces 226 are disposed between the respective layers 216-224 and are designed to enable interfacial adhesion between the respective layers. While two examples of layering a hard coat layer upon an anti-static layer and a device lens are shown, any suitable number of layers may be used depending on the particular design in which anti-static coatings are implemented. For instance, fewer alternating layers may be used where more overall flexibility of the device lens coatings is desired, while additional alternating layers may be used where a device is more likely to encounter greater impact. Examples of particular materials that may be used in anti-static lens coatings are shown and described in further detail with reference to FIGS. 3 and 4.

Figure 3:
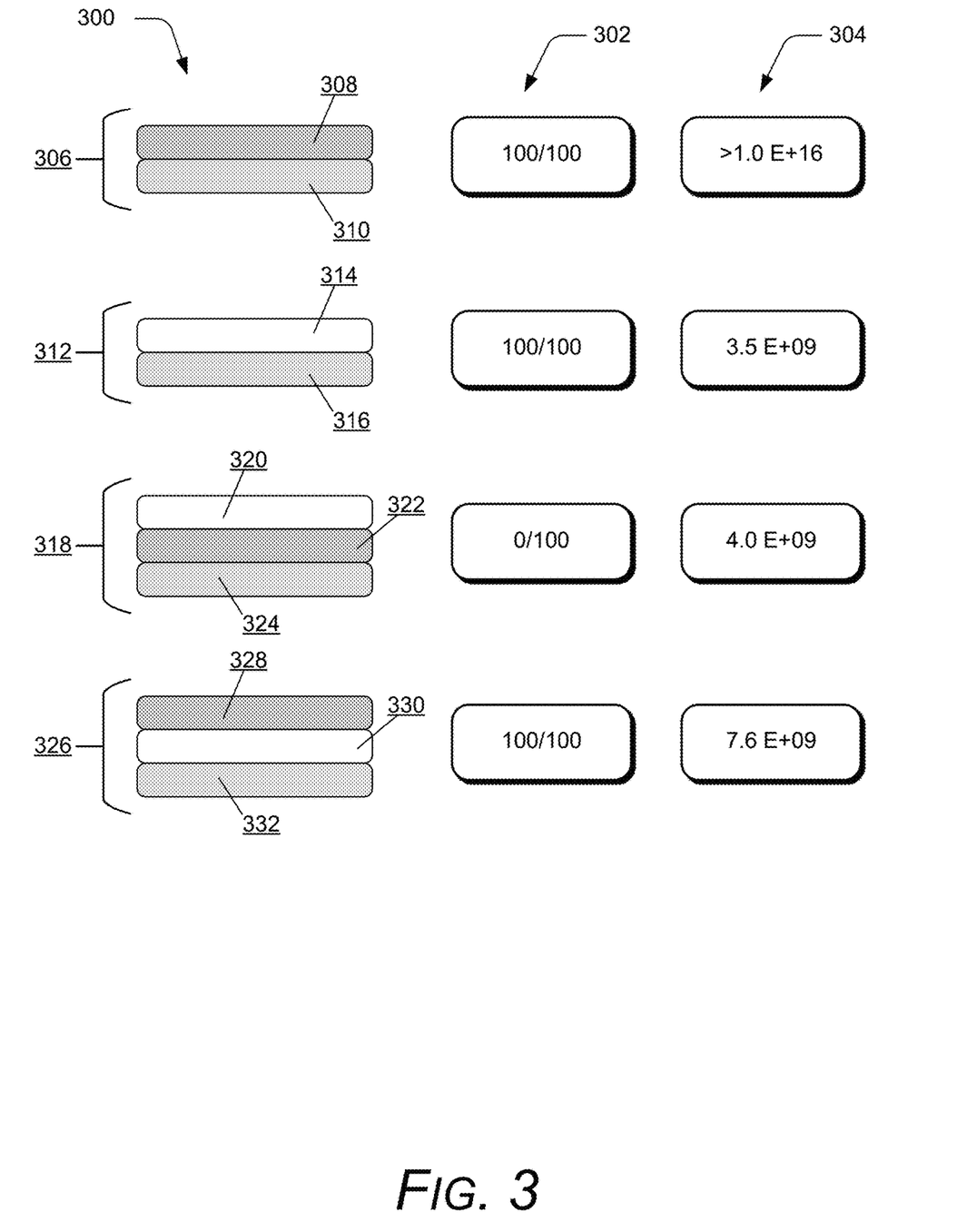
FIG. 3 illustrates example configurations and materials of anti-static lens coatings as described herein.

FIG. 3 illustrates an example 300 of materials in configurations that may be used in anti-static lens coatings, such as the electronic device 102, implementing the techniques described herein. In particular, the example 300 illustrates polyethylene terephthalate (PET) films, which may correspond to the lens layer 114, along with hard coat material layers and anti-static material layers in various configurations. While not explicitly shown, any of the configurations shown in the example 300 may include interfaces disposed between the respective layers that are designed to enable interfacial adhesion as described in relation to FIG. 2. Column 302 provides results of cross-cut tests where a 10×10 grid area, for instance, is cut with a razor, and tape is attached to the grid area and subsequently removed. Remaining areas of the grid quantify adhesion. For example, a test result of 100/100 indicates 100 areas remain adhered per 100 areas tested, and column 304 indicates surface resistance in ohms/square.

A first set of layers 306 is shown, which includes a hard coat layer 308 disposed on a PET film 310. The first set of layers 306 is not conductive, exhibiting a measured surface resistance of >1.0 E+16 ohms/square. A second set of layers 312 is also shown, which includes an anti-static layer 314 disposed on a PET film 316. The second set of layers 312 is conductive, exhibiting a measured surface resistance of 3.5 E+09 ohms/square. Although the anti-static layer 314 is effective to prevent static build-up on the PET film 316, the anti-static layer does not provide the same protection as a hard coat layer from wear and scratches. On the other hand, because the hard coat layer 308 in the first set of layers 306 is not conductive, it is likely to cause foreign materials to build up on the surface.

A third set of layers 318 is then shown, which includes an anti-static layer 320 disposed on a hard coat layer 322, disposed on a PET film 324. The third set of layers 318 is also conductive, exhibiting a measured surface resistance of 4.0 E+09 ohms/square. However, the anti-static layer 320 delaminates from the hard coat layer 322, as exhibited by adhesion of 0 of 100 areas tested. A fourth set of layers 326 is shown, which includes a hard coat layer 328 disposed on an anti-static layer 330, disposed on a PET film 332. The fourth set of layers 326 not only has an adhesion of 100 of 100 areas tested, but is also conductive, exhibiting a measured surface resistance of 7.6 E+09 ohms/square. Therefore, the order of the layers shown in the fourth set of layers 326 yields a PET film that is both abrasion resistant from the hard coat layer 328 as well as capable of preventing static build-up from the anti-static layer 330.

Figure 4:
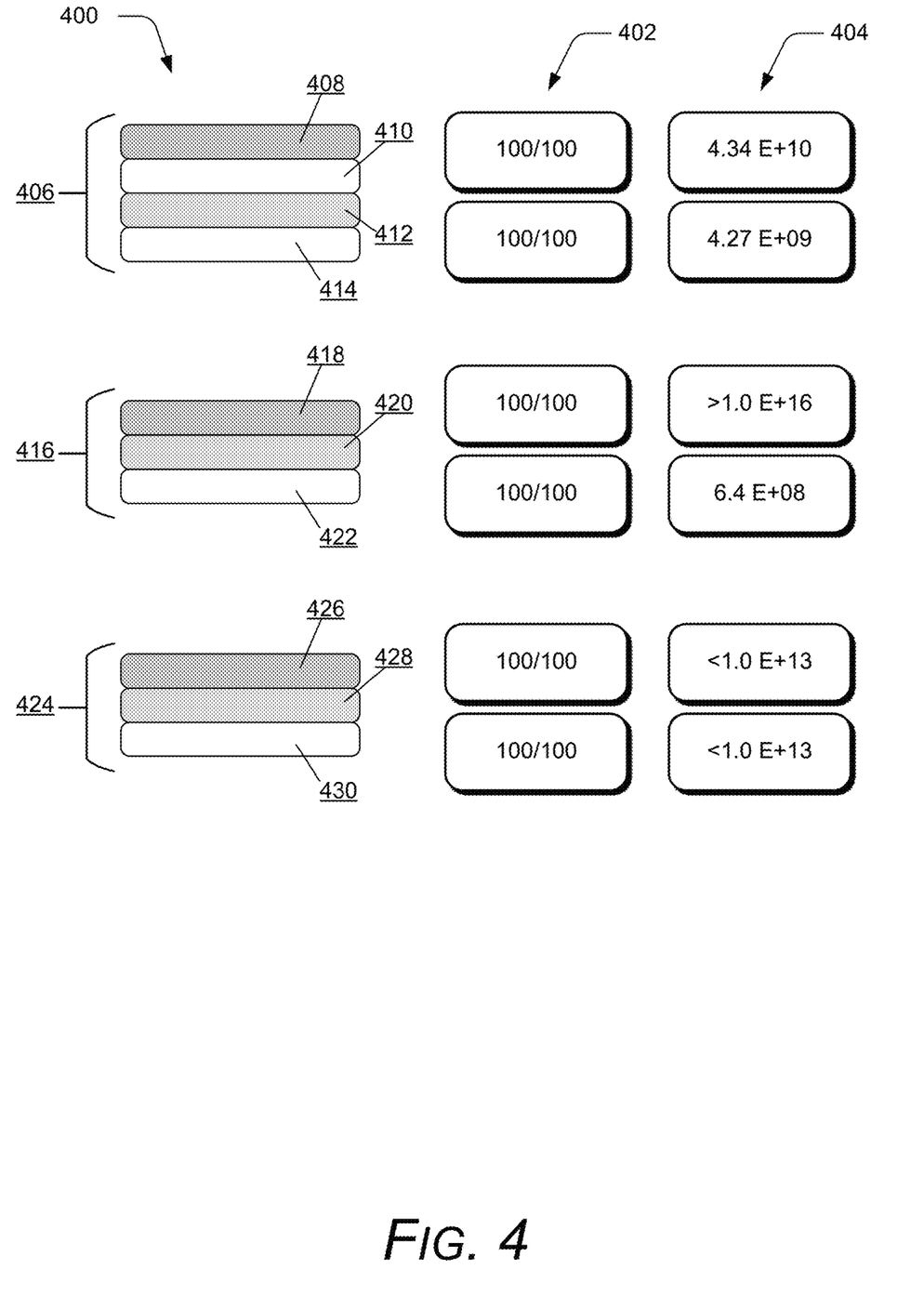
FIG. 4 illustrates example configurations and materials of anti-static lens coatings as described herein.

FIG. 4 illustrates additional examples 400 of materials in configurations that may be used in anti-static lens coatings, such as the electronic device 102, implementing the techniques described herein. In particular, the additional examples 400 illustrate polymethylmethacrylate/polycarbonate/polymethylmethacrylate (PMMA/PC/PMMA) coextruded films and polycarbonate (PC) films, which may correspond to the lens layer 114, along with hard coat layers and anti-static layers in various configurations. While not explicitly shown, any of the configurations shown in the example 400 may include interfaces disposed between the respective layers that are designed to enable interfacial adhesion as described in relation to FIG. 2. Column 402 indicates adhesion per 100 areas tested, and column 404 indicates surface resistance in ohms/square.

A first set of layers 406 is shown, which includes a hard coat layer 408, disposed on an anti-static layer 410, disposed on a PMMA/PC/PMMA film 412, with another anti-static layer 414 disposed on a reverse side. Two adhesions are listed, one for each respective anti-static layer 410 and 414. Additionally, two surface resistances are listed, 4.34 E+10 and 4.27 E+9 for the respective outer surfaces of the hard coat layer 408 and the anti-static layer 414. The surface resistances in the first set of layers 406 is conductive and prevents static build-up, while the hard coat layer 408 provides additional protection from scratches and dents.

A second set of layers 416 is shown, which includes a hard coat layer 418, disposed on a PMMA/PC/PMMA film 420, with an anti-static layer 422 disposed on a reverse side. Two adhesions are listed, one for the hard coat layer 418 and one for the anti-static layer 422. Additionally, two surface resistances are listed, >1.0 E+16 and 6.4 E+08 for the respective hard coat layer 418 and the anti-static layer 422. In this configuration, the surface resistance is similar to the first set of layers 306 of FIG. 3, and is not conductive to prevent static build-up on the surface of the hard coat layer 418.

A third set of layers 424 is then shown, which includes an anti-static layer 426, disposed on a PC film 428, with another anti-static layer 430 disposed on a reverse side. Two adhesions are listed, one for the anti-static layer 426 and one for the anti-static layer 430. Additionally, two surface resistances are listed, <1.0 E+13 and <1.0 E+13 for each of the respective anti-static layers 426 and 430. The anti-static layers 426 and 430 in this example are formulated from acrylic prepolymers and antimony oxides and/or antimony tin oxides. The anti-static layers 426 and 430 are an acrylate coating containing, for example, 0.01 atomic % to 5.0 atomic % antimony oxides and/or antimony tin oxides. As indicated by the surface resistances for the third set of layers 424, the antimony oxide and/or antimony tin oxide used in this example is conductive, but less conductive than coatings which contain chloride salts and do not provide the abrasion resistance of other hard coat layer materials.

Figure 5:
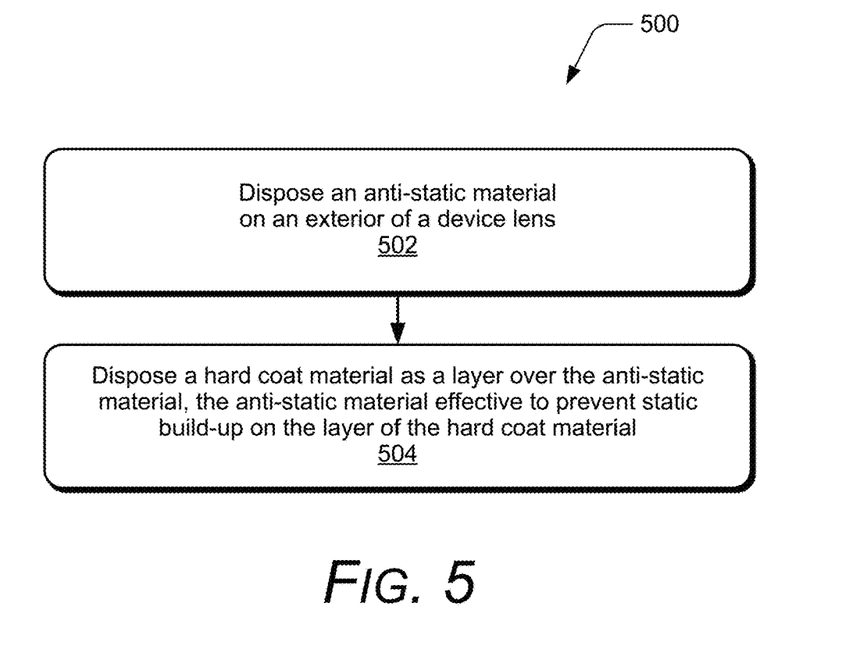
FIG. 5 illustrates an example method of application of anti-static lens coatings as described herein.

FIG. 5 illustrates an example method 500 of anti-static lens coatings. The order in which the method is described is not intended to be construed as a limitation, and any number or combination of the described method operations can be performed in any order to perform a method, or an alternate method.

At 502, an anti-static material is disposed on an exterior of a device lens. For example, the anti-static material may form the anti-static material 112 and/or the anti-static layer 206. The device lens may correspond to the device lens 208 and/or the lens layer 114. The anti-static material may be a film that is disposed on the exterior of the device lens by gas, liquid, or solid film deposition techniques. Alternatively or additionally, the anti-static material may be disposed on the device lens in a liquid form, followed by heating or applying ultraviolet (UV) radiation to the anti-static material to cure the anti-static material.

At 504, a hard coat material is disposed as a layer over the anti-static material, where the anti-static material is effective to prevent static build-up of the layer of the hard coat material. The hard coat material may correspond to the hard coat material 110 and/or the hard coat layer 204. Although the anti-static material 112 is covered by the hard coat material 110, the anti-static material is still effective to prevent static build-up on the layer of the hard coat material. For example, the hard coat material 110 may attract foreign materials such as dust. Additionally or alternatively, the hard coat material 110 may contain particulates, which cause foreign materials to be drawn to the hard coat material. However, the anti-static material 112 disposed between the hard coat material 110 and the lens layer 114 dissipates charges that may accumulate on the hard coat material, thus preventing static build-up on the hard coat material. The hard coat material 110 may be a film or sheet that is disposed on the anti-static material 112.

Figure 6:
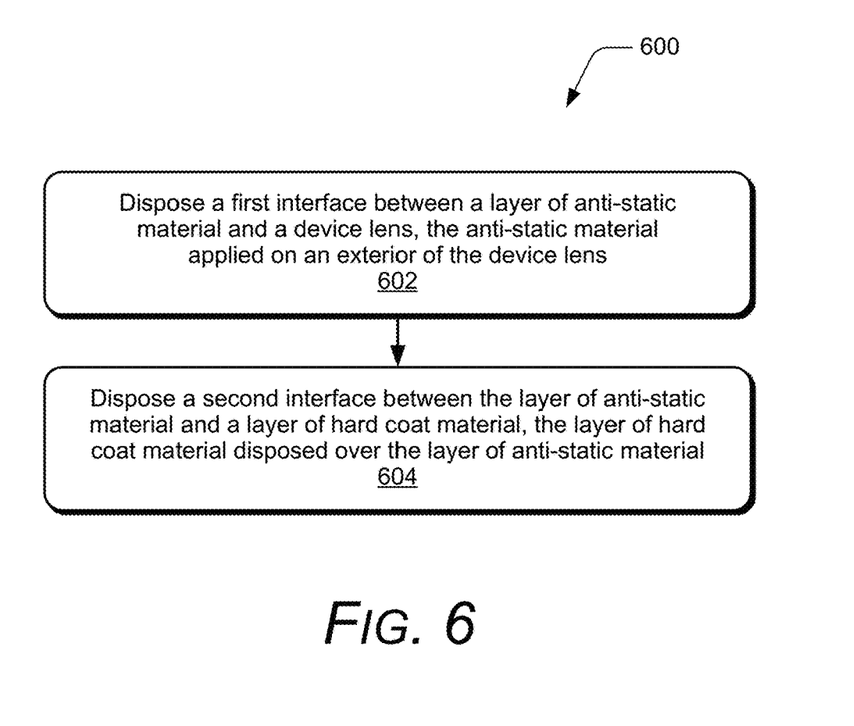
FIG. 6 illustrates an example method of application of interfaces used with anti-static lens coatings as described herein.

FIG. 6 illustrates an example method 600 of anti-static lens coatings. The order in which the method is described is not intended to be construed as a limitation, and any number or combination of the described method operations can be performed in any order to perform a method, or an alternate method.

At 602, a first interface is disposed between a layer of anti-static material and a device lens, where the anti-static material is applied on an exterior of the device lens. For example, the anti-static material may form the anti-static material 112 and/or the anti-static layer 206. The device lens may correspond to the device lens 208 and/or the lens layer 114. Further, the first interface may be the interface 212. The interface 212 is designed to enable interfacial adhesion between the device lens 208 and the anti-static layer 206. The interface 212 may be a surface treatment disposed on a face of the device lens 208 and/or the anti-static layer 206. A surface treatment of the interface 212 binds the anti-static layer 206 to the device lens 208, such as with the application of heat, UV radiation, and so forth.

At 604, a second interface is disposed between the layer of anti-static material and a layer of hard coat material, where the layer of hard coat material is disposed over the layer of anti-static material. In this example, the anti-static material is still effective to prevent static build-up on the layer of the hard coat material despite being underneath the hard coat material in the described configuration. The hard coat material may correspond to the hard coat material 110 and/or the hard coat layer 204, and the second interface may be the interface 210. The interface 210 is designed to enable interfacial adhesion between the anti-static layer 206 and the hard coat layer 204. The interface 210 may be a surface treatment disposed on a face of the hard coat layer 204 and/or the anti-static layer 206. A surface treatment of the interface 210 binds the anti-static layer 206 to the hard coat layer 204, such as with the application of heat, UV radiation, and so forth.

Although implementations of anti-static lens coatings have been described in language specific to features and/or methods, the subject of the appended claims is not necessarily limited to the specific features or methods described. Rather, the specific features and methods are disclosed as example implementations of anti-static lens coatings, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A device lens, comprising: an anti-static material disposed on an exterior of the device lens; and a hard coat material disposed as a layer over the anti-static material, the anti-static material effective to prevent static build-up on the layer of the hard coat material.

Alternatively or in addition to the above described device lens, any one or combination of: the anti-static material comprises acrylic prepolymers and conductive salt. A cation in the conductive salt is selected from sodium chloride, potassium chloride, magnesium chloride, calcium chloride, or ammonium chloride. An interface between the anti-static material and the hard coat material, the interface being surface treated to provide interfacial adhesion between the anti-static material and the hard coat material. The anti-static material is effective to prevent the static build-up on the layer of the hard coat material by dissipating charges that accumulate on the hard coat material. The device lens is a polyethylene terephthalate (PET) lens. The device lens is a polymethylmethacrylate/polycarbonate/polymethylmethacrylate (PMMA/PC/PMMA) lens. The device lens is a polymethylmehtacrylate/polycarbonate (PMMA/PC) lens. The device lens is a polycarbonate (PC) lens. The device lens is a polyamide (PA) lens. The device lens is a colorless polyimide (CPI) lens.

An anti-static material, comprising: a first surface treatment disposed on a device lens, the first surface treatment binding the anti-static material to the device lens; and a second surface treatment disposed on the anti-static material, the second surface treatment binding the anti-static material to a hard coat material, the anti-static material preventing static build-up on the hard coat material.

Alternatively or in addition to the above described anti-static material, any one or a combination of: the anti-static material comprises acrylic prepolymers and conductive salt. The conductive salt is a chloride salt with a cation selected from sodium, potassium, magnesium, calcium, or ammonium. The anti-static material is effective to prevent the static build-up on the hard coat material by dissipating charges that accumulate on the hard coat material. The device lens is one of: a polyethylene terephthalate (PET) lens; a polymethylmethacrylate/polycarbonate/polymethylmethacrylate (PMMA/PC/PMMA) lens; a polymethylmethacrylate/polycarbonate (PMMA/PC) lens; a polycarbonate (PC) lens; a polyamide (PA) lens; or a colorless polyimide (CPI) lens. The hard coat material comprises acrylate and/or urethane prepolymers and silica particles.

A method, comprising: disposing an anti-static material on an exterior of a device lens; and disposing a hard coat material as a layer over the anti-static material, the anti-static material effective to prevent static build-up on the layer of the hard coat material.

Alternatively or in addition to the above described method, any one or a combination of: the anti-static material comprises acrylic prepolymers and conductive salt. The anti-static material is effective to prevent the static build-up on the hard coat material by dissipating charges that accumulate on the hard coat material. The device lens is one of: a polyethylene terephthalate (PET) lens; a polymethylmethacrylate/polycarbonate/polymethylmethacrylate (PMMA/PC/PMMA) lens; a polymethylmethacrylate/polycarbonate (PMMA/PC) lens; a polycarbonate (PC) lens; a polyamide (PA) lens; or a colorless polyimide (CPI) lens. The hard coat material comprises acrylate and/or urethane prepolymers and silica particles.

What is claimed is:

1. A device lens of an electronic device, comprising:
   an anti-static layer comprising anti-static material disposed on an exterior of the device lens over a touchscreen display of the electronic device;
   a hard coat layer comprising hard coat material disposed directly over the anti-static layer, the anti-static material effective to prevent static build-up on the hard coat layer in a user environment;
   an interface to adhere the anti-static layer and the hard coat layer, the interface being surface treated to provide interfacial adhesion between the anti-static material and the hard coat material;
   an additional anti-static layer comprising additional anti-static material disposed directly over the hard coat layer; and
   an additional hard coat layer comprising additional hard coat material disposed directly over the additional anti-static layer.

2. The device lens as recited in claim 1, wherein the anti-static material comprises acrylic prepolymers and conductive salt.

3. The device lens as recited in claim 2, wherein a cation in the conductive salt is selected from sodium chloride, potassium chloride, magnesium chloride, calcium chloride, or ammonium chloride.

4. The device lens as recited in claim 1, wherein the anti-static material is effective to prevent the static build-up on the hard coat layer by dissipating charges that accumulate on the hard coat layer.

5. The device lens as recited in claim 1, wherein the device lens is a polyethylene terephthalate (PET) lens.

6. The device lens as recited in claim 1, wherein the device lens is a composite polymethylmethacrylate-polycarbonate-polymethylmethacrylate (PMMA/PC/PMMA) lens.

7. The device lens as recited in claim 1, wherein the device lens is a coextruded composite film lens comprising polymethylmethacrylate (PMMA) and polycarbonate (PC).

8. The device lens as recited in claim 1, wherein the device lens is a polycarbonate (PC) lens.

9. The device lens as recited in claim 1, wherein the device lens is a polyamide (PA) lens.

10. The device lens as recited in claim 1, wherein the device lens is a colorless polyimide (CPI) lens.

11. An anti-static material, comprising:
    a first surface treatment disposed on an electronic device lens, the first surface treatment configured to bind the anti-static material to the electronic device lens to create an anti-static layer over the electronic device lens; and a second surface treatment disposed on the anti-static material, the second surface treatment configured to:
  bind the anti-static material to a hard coat material to create a hard coat layer over the anti-static layer; and
  form an interface that provides interfacial adhesion between the anti-static material and the hard coat material, the anti-static material configured to prevent static build-up on the hard coat material in a user environment; and
an additional hard coat layer comprising additional hard coat material disposed directly over an additional anti-static layer comprising additional anti-static material that is disposed directly over the hard coat layer.

12. The anti-static material as recited in claim 11, wherein the anti-static material comprises acrylic prepolymers and conductive salt.

13. The anti-static material as recited in claim 12, wherein the conductive salt is a chloride salt with a cation selected from sodium, potassium, magnesium, calcium, or ammonium.

14. The anti-static material as recited in claim 11, wherein the anti-static material is effective to prevent the static build-up on the hard coat layer by dissipating charges that accumulate on the hard coat layer.

15. The anti-static material as recited in claim 11, wherein the electronic device lens is one of:
  a polyethylene terephthalate (PET) lens;
  a composite polymethylmethacrylate-polycarbonate-polymethylmethacrylate (PMMA/PC/PMMA) lens;
  a coextruded composite film lens comprising polymethylmethacrylate (PMMA) and polycarbonate (PC);
  a polycarbonate (PC) lens;
  a polyamide (PA) lens; or
  a colorless polyimide (CPI) lens.

16. The anti-static material as recited in claim 11, wherein the hard coat material comprises acrylate and/or urethane prepolymers and silica particles.

17. A method, comprising:
  disposing an anti-static layer comprising anti-static material on an exterior of an electronic device lens over a touchscreen display of an electronic device;
  disposing a hard coat layer comprising hard coat material directly over the anti-static layer, the anti-static material effective to prevent static build-up on the hard coat layer in a user environment;
  applying a surface treatment as an interface adhering the anti-static layer and the hard coat layer, the surface treatment providing interfacial adhesion between the anti-static material and the hard coat material;
  disposing an additional anti-static layer comprising additional anti-static material directly over the hard coat layer; and
  disposing an additional hard coat layer comprising additional hard coat material directly over the additional anti-static layer.

18. The method as recited in claim 17, wherein the anti-static material comprises acrylic prepolymers and conductive salt.

19. The method as recited in claim 17, wherein the anti-static material is effective to prevent the static build-up on the hard coat layer by dissipating charges that accumulate on the hard coat layer.

20. The method as recited in claim 17, wherein the electronic device lens is one of:
  a polyethylene terephthalate (PET) lens;
  a composite polymethylmethacrylate-polycarbonate-polymethylmethacrylate (PMMA/PC/PMMA) lens;
  a coextruded composite film lens comprising polymethylmethacrylate (PMMA) and polycarbonate (PC);
  a polycarbonate (PC) lens;
  a polyamide (PA) lens; or
  a colorless polyimide (CPI) lens.

21. The method as recited in claim 17, wherein the hard coat material comprises acrylate and/or urethane prepolymers and silica particles.

* * * * *